(12) United States Patent
Prance et al.

(10) Patent No.: US 8,798,947 B2
(45) Date of Patent: Aug. 5, 2014

(54) APPARATUS AND METHOD FOR MEASURING CHARGE DENSITY DISTRIBUTION

(75) Inventors: Helen Prance, Brighton (GB); Robert John Prance, Brighton (GB); Philip Watson, Hove (GB); Sam Thomas Beardsmore-Rust, Portslade (GB)

(73) Assignee: The University of Sussex-Falmer, Brighton (GB)

( * ) Notice: Subject to any disclaimer, the term of this patent is extended or adjusted under 35 U.S.C. 154(b) by 250 days.

(21) Appl. No.: 13/163,988

(22) Filed: Jun. 20, 2011

(65) Prior Publication Data

US 2012/0323513 A1 Dec. 20, 2012

(51) Int. Cl.
*G06F 19/00* (2011.01)

(52) U.S. Cl.
USPC .......................................................... 702/65

(58) Field of Classification Search
USPC ............................................. 702/65, 85, 137
See application file for complete search history.

(56) References Cited

U.S. PATENT DOCUMENTS

| | | | | |
|---|---|---|---|---|
| 3,953,664 | A * | 4/1976 | Tsunashima | 174/264 |
| 6,035,013 | A * | 3/2000 | Orava et al. | 378/37 |
| 6,316,942 | B1 * | 11/2001 | Horiguchi | 324/457 |
| 6,661,004 | B2 * | 12/2003 | Aumond et al. | 250/306 |
| 6,701,265 | B2 * | 3/2004 | Hill et al. | 702/91 |
| 7,466,148 | B2 * | 12/2008 | Fridman et al. | 324/686 |
| 7,885,700 | B2 * | 2/2011 | Clark et al. | 600/372 |
| 8,148,163 | B2 * | 4/2012 | Hofstadler et al. | 436/150 |
| 8,264,247 | B2 * | 9/2012 | Prance et al. | 324/713 |
| 8,400,169 | B2 * | 3/2013 | Douglas | 324/686 |
| 2006/0058694 | A1 * | 3/2006 | Clark et al. | 600/509 |
| 2007/0170140 | A1 * | 7/2007 | Gaunekar et al. | 212/312 |
| 2008/0223122 | A1 * | 9/2008 | Watanabe et al. | 73/105 |
| 2009/0185725 | A1 * | 7/2009 | Bond | 382/124 |
| 2009/0309605 | A1 * | 12/2009 | Prance et al. | 324/457 |

OTHER PUBLICATIONS

P. Watson, et al., Centre for Physical Electronics and Quantum Technology, School of Engineering and Design, University of Sussex, Falmer, Brighton, BN1 9QT, UK, "Imaging electrostatic fingerprints with implications for a forensic timeline"; 2011 Elsevier Ireland, Ltd, doi:10.1016/j.forsciint.2011.02.024; Forensic Science International 209 (2011) e41-e45.

S T Beardsmore-Rust, et al; Imaging of charge spatial density on insulating materials; Measurement Science and Technology 20 (2009)-095711; pp. 1-6.

Watson, et al; Imaging the microscopic properties of dielectrics via potential and charge; Proceedings of ESA Annual Meeting on Electrostatics 2010; pp. 1-7.

* cited by examiner

*Primary Examiner* — Sujoy Kundu
*Assistant Examiner* — Corey Bailey
(74) *Attorney, Agent, or Firm* — Locke Lord LLP

(57) ABSTRACT

The invention provides a method and apparatus for the detection of charge density distribution at the surface of a material sample. The apparatus comprises an electric potential sensor for measuring surface charge on a material sample, wherein the electrical potential sensor includes a probe for capacitively coupling the electric potential sensor to the surface of the material sample, an amplifier for generating a measurement output, the probe being connected to an input of the amplifier and the measurement output being supplied at an output of the amplifier, and a feedback arrangement driven from the output of the amplifier for enhancing the input impedance of the amplifier. A positioning system mounts the probe of the electric potential sensor above the material sample and moves the probe at a constant height over a surface of the said sample, and a processing system receives and processes the measurement output of the electric potential sensor for generating a digital record of the charge density distribution at the surface of the material sample.

14 Claims, 10 Drawing Sheets

APPARATUS AND METHOD FOR MEASURING CHARGE DENSITY DISTRIBUTION

FIELD OF THE INVENTION

The invention concerns apparatus and a method for measuring charge density distribution, and particularly apparatus and a method for measuring such charge density distribution resulting from fingerprints.

BACKGROUND OF THE INVENTION

Classic fingerprint evidence remains a primary forensic method of identification in many criminal cases. Techniques are known for detecting fingerprints on a variety of materials, but they generally rely on either visible deposits or hidden (latent) fingerprints resulting from the transfer of residues from the finger to the surface.

Microscopic imaging techniques for this purpose suffer from severe limitations of scan area and scan speed. For example, atomic force microscopy can discern fingerprint residue on glass, but the scan area is restricted to 40 µm×40 µm, insufficient to image a whole fingerprint. Scanning electrochemical microscopy has a somewhat larger, but still restricted, scan area of 5 mm×3 mm; however, the scan time is 5 hours and significant sample preparation is required. Scanning Kelvin probe microscopy for latent fingerprint imaging is non-destructive and preserves DNA material, but is applicable to conducting surfaces only. The scan area and scan speed achieved are sufficiently large to allow a whole fingerprint image to be built up, but the scan time is relatively long, between 6 and 30 hours.

In addition, it is extremely difficult using conventional techniques to establish from fingerprint evidence alone even an approximate timeline of events, in terms of the length of time which has elapsed since the deposition of a fingerprint. Techniques for determining the time elapsed since deposition are generally based on one at least of: physical appearance; the effects of environmental factors; and chemical changes in the constituents of latent fingerprints. The first two methods suffer from the difficulty of reproducing the original conditions and hence of establishing what changes have occurred since the original event. The third is considered to be the most viable candidate practically, but latent prints are affected by a wide variety of factors, including subject factors and transfer and storage conditions. Subject factors include, for example, stress, metabolism, diet, health, age, sex, occupation and quantity and quality of finger contamination, all of which need to be taken into consideration. Transfer conditions include surface texture, physio-chemical structure, curvature, temperature, temperature difference, pressure and contact time. Storage environment parameters that are relevant include temperature, humidity, UV radiation, dust precipitation, condensation, friction, air circulation and atmospheric contamination.

Accordingly, the known techniques suffer from a variety of disadvantages, including cumbersome technology, the need for complex processing to factor in all of the possible variables, and the difficulty of achieving accurate measurements and/or evaluation.

SUMMARY OF THE INVENTION

The invention seeks to address the above problems by providing apparatus and a method for measuring charge density distribution at the surface of an insulating or semi-conductor material.

In particular, in the preferred embodiment, the invention seeks to address the above problems by providing apparatus and a method for measuring charge density distribution resulting from contact of a finger on an electrically insulating surface.

The invention may equally be applied to measurement of charge density at the surface of a semi-conductor material.

The invention, in the preferred embodiment described below, proposes using an electric field microscopy system to image electrical charge deposited due to a finger touching a thin insulating surface.

According to the present invention from one aspect, there is provided apparatus for measuring charge density distribution at the surface of a material sample, comprising: an electric potential sensor for measuring surface charge density, wherein the electrical potential sensor comprises a probe for capacitively coupling the electric potential sensor to the surface of a material sample, an amplifier for generating a measurement output, the probe being connected to an input of the amplifier and the measurement output being supplied at an output of the amplifier, and a feedback arrangement driven from the output of the amplifier for enhancing the input impedance of the amplifier; a positioning system for mounting the probe of the electric potential sensor above the surface of the material sample and for moving the probe at a constant height over the surface; and a processing system for receiving and processing the measurement output of the electric potential sensor for generating a digital record of the charge density distribution at the said surface.

According to the present invention from another aspect, there is provided a method of detection charge density distribution at the surface of a material sample, comprising: mounting a probe of an electric potential sensor above a material sample, wherein the electrical potential sensor comprises said probe for capacitively coupling the electric potential sensor to the surface of the material sample, an amplifier for generating a measurement output, the probe being connected to an input of the amplifier and the measurement output being supplied at an output of the amplifier, and a feedback arrangement driven from the output of the amplifier for enhancing the input impedance of the amplifier; moving the probe at a constant height over a surface of the said material sample; measuring charge density at the surface of the material sample by means of the electrical potential sensor; and receiving and processing the measurement output of the electric potential sensor for generating a digital record of the charge density distribution at the surface of the material sample.

The inventive method is distinct from conventional forensic electrostatic methods, such as electrostatic discharge apparatus (ESDA), as in conventional photocopying, where a large electric field is applied in order to reveal latent images, which may include fingerprints.

The preferred embodiment employs a high spatial resolution raster scanning microscope, for example having a step size of 6 microns, capable of measuring static charge via weak capacitive coupling. Such a scanning system is defined herein as a scanning electric potential microscopy system. A scanning electric potential microscopy system can operate at a flexible resolution scale, allowing a trade-off between scanning speed and spatial resolution. Such a system fulfils the need for microscopic surface measurement at coarser length scales where atomic resolution scanning probe microscopy becomes cumbersome and slow.

Advantageously, the system comprises a high impedance electric potential sensor, along with a carefully defined electrode structure. The sensor measures surface electric potential via non-contact, weak capacitive coupling. A true non-invasive measure of electric potential is possible, with no risk of sample damage as a result of high current densities arising at the electrode-sample interface, as in the case of an atomic force microscope, or as a result of physical contact.

In the preferred embodiment, the electric potential sensor is thus used as a non-contact raster scanning probe capable of measuring surface charge density with a spatial resolution of up to 5 µm. The sensor is paired with a robust electrode structure that can withstand significant mechanical and environmental stress.

The electric potential sensor provides a direct measure of electric potential, and experimental results represent a significant improvement over previous efforts.

In an alternative embodiment, a single scanned electric potential sensor is replaced by a linear or matrix array of such sensors.

According to the invention, the imaging of fingerprints using this technique also forms the basis for a method to estimate the time elapsed since deposition.

The invention thus relies on detecting a deposited electrical charge, which has been found to be almost independent of both the subject and the transfer method. The decay of the resulting surface charge is a function of the physical properties of the material and the environmental conditions prevailing. Clearly, the material may easily be characterised using a known test charge, leaving only the environmental factors to be determined.

Preliminary experimental results yield two principle findings: Firstly, they indicate that the spatial resolution of the fingerprint image is sufficient for identification purposes; and, secondly, they show that the decay of the surface charge may be considered as a candidate method for the dating or sequencing of the fingerprints. The decay of surface charge with time is well defined, largely material dependent, and may take many days. This intrinsic decay rate for the material may be quantified using the charge imaging system described herein and a known test charge. The measurement technique described is non destructive, may be repeated without degradation of the sample, and does not preclude the subsequent use of other techniques such as DNA analysis or conventional latent fingerprint development.

In the method described, the extant electric field is measured arising from the deposited electrical charge. Such field is, therefore, not dependent on chemical deposits. The images generated have a spatial resolution appropriate for identification purposes, and have been found to be of comparable quality to conventional fingerprint images. Furthermore, the decay of the charge image with time can be observed and has two major implications: Firstly, this method does not suffer from the background noise caused by a history of old fingerprints; and, secondly, it has the potential to determine the time sequence of recent charge fingerprint images.

An additional benefit over conventional latent fingerprint development techniques is the non-destructive nature of measurement according to the invention, allowing subsequent examination and processing of the fingerprint after charge imaging. The principle of static charge measurement at the microscopic length scale using an electric potential sensor makes this advance possible.

The preferred embodiment yields charge measurement at a spatial resolution in the range from 1 to 100 microns, and at high spatial resolution measurements of electric potential at the 1 µm scale. Charge measurement has been demonstrated to be effective for a range of insulating materials, including modern plastics such as PVC, PTFE, acetate and PVDF sheets.

BRIEF DESCRIPTION OF THE DRAWINGS

The invention is described further, by way of example only, with reference to the accompanying drawings, in which.

DETAILED DESCRIPTION

Figure 1:
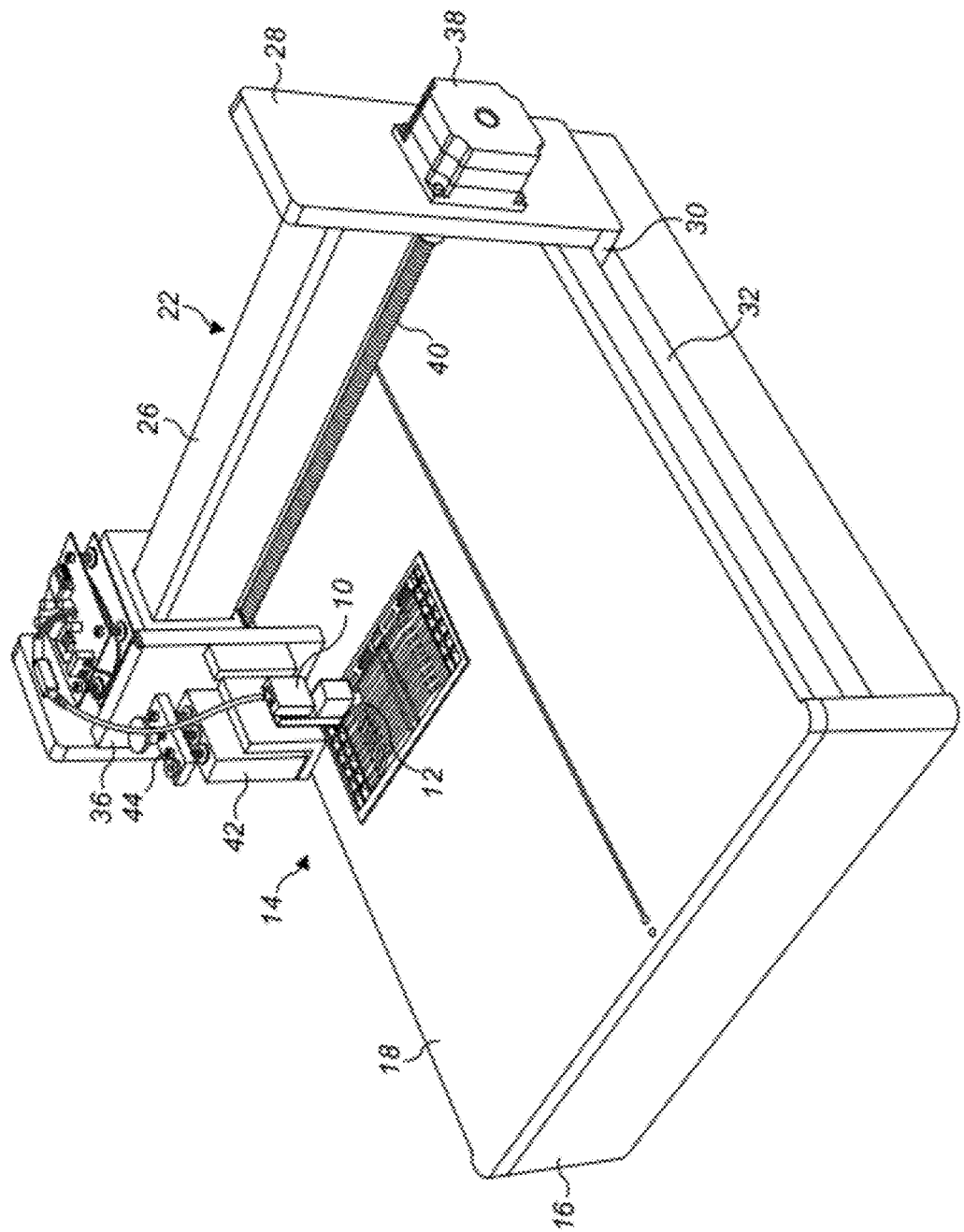
FIG. 1 is a perspective view of fingerprint detection apparatus according to the present invention.
Figure 2A:
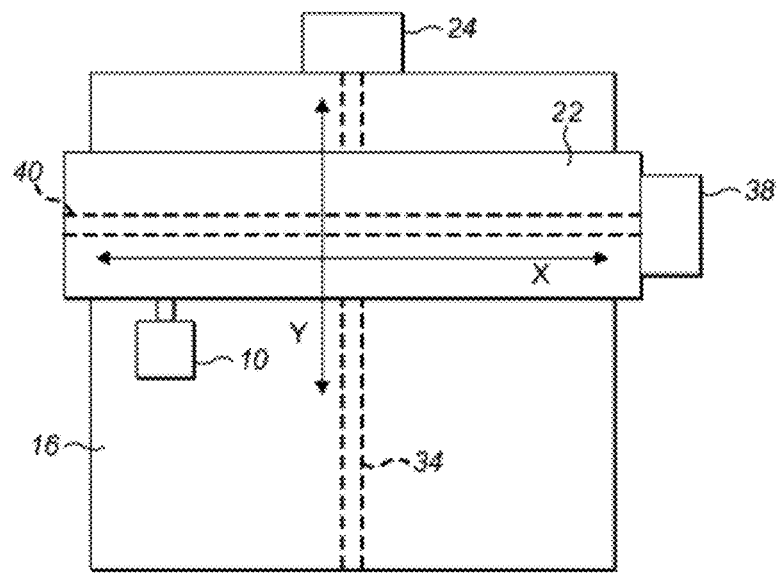
FIGS. 2a, 2b and 2c are respectively plan, end and side views of a positioning and scanning system of the fingerprint detection apparatus.
Figure 2B:
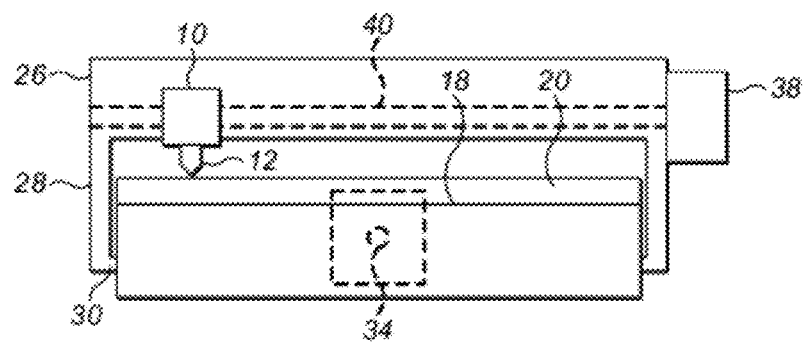
Figure 2C:
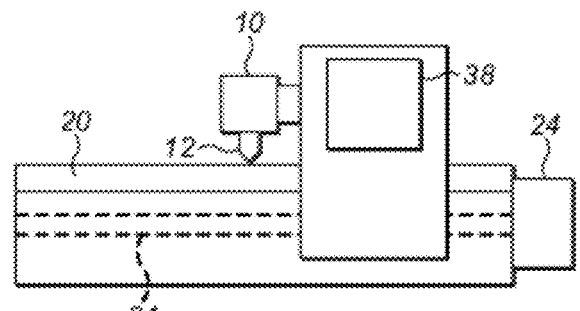

Referring initially to FIGS. 1 to 7, an embodiment of fingerprint detection apparatus according to the invention comprises a single electric potential sensor 10, a coaxial sensing probe 12 and a 3-axis positioning system 14, as shown.

The positioning system 14 comprises a flatbed support 16 having a horizontal plate surface 18 on which a sheet 20 of material, such as an insulating material, bearing a fingerprint may be placed. The electrical potential sensor 10 is mounted above the plate surface 18 to support the coaxial sensing probe 12 at a constant height above the plate surface 18 for scanning movement in the X-Y direction over the sheet 20. For this purpose, a gantry 22 is mounted on the base 16 for displacement in the Y direction along the full length of the plate 18 under the control of a stepper motor 24. The gantry 22 comprises a cross bar 26 extending between a pair of end plates 28 mounted on drive plates 30 located in linear slide bearing rails 32 on each side of the base 16. The drive plates 30 terminate in a collar (not shown) that engages with a screw 34 driven by the motor 24.

Mounted on the gantry 22 is a carriage 36 driven by a stepper motor 38 for displacement along the full length of the cross bar 26, i.e. in the X direction of the base plate 18. For this purpose, the stepper motor 38 drives a screw 40 on which a collar (not shown) of the carriage 36 is engaged. The electric potential sensor 10 is mounted on the carriage 36 and, accordingly, is movable by means of the two stepper motors 24, 38 to any X-Y position over the base plate 18 for detecting surface charge by means of the coaxial probe 12 and taking a measurement. In practice, the two stepper motors 24, 38 are arranged to move the electric potential sensor 10 in six micrometer steps, stopping after each step movement to allow a new measurement to be obtained.

Furthermore, the coaxial probe 12 is mounted on the carriage 36 via a sliding carriage 42 and screws 44 to provide linear Z-axis control to set a fixed sample-probe separation.

Figure 3:
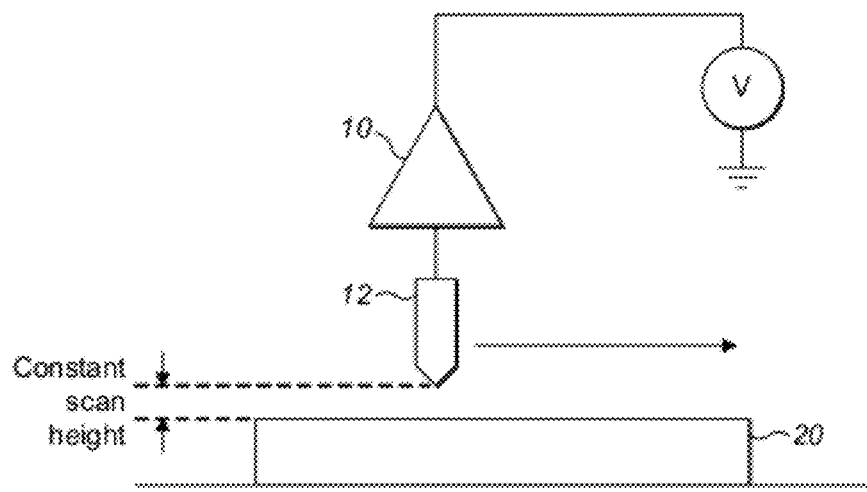
FIG. 3 is a diagrammatic view of the relationship between a sensing probe of the scanning apparatus and a sample sheet bearing a fingerprint.

FIG. 3 shows the electric potential sensor 10 mounted over the sheet 20 bearing the fingerprint sample, and demonstrates the constant height, for example 80 micrometer, of the sensing probe 12 above the upper surface of the sheet 20. As shown, the probe picks up a signal from the sample by virtue of the sensing probe 12 capacitively coupling with the electrical surface charge of the fingerprint on the sheet 20. The signal is detected by the electric potential sensor 10 and supplied as a voltage measurement for processing, as will be described below.

The stepper motor driven 3-axis positioning system allows probe scanning with a predetermined, for example 6 μm, step size in the X-Y plane. A custom built signal acquisition and motor control system is interfaced to a PC via a single USB connection to enable automated scanning, as described below. This system is used to raster scan the sensor probe 12 over the surface of the sample at a constant height in order to produce charge image data. Unlike force microscope based systems, the scan area may be large, up to 300×300 mm, with the present apparatus.

The scanned electric potential sensor probe 12 is used to make many point measurements in order to construct an image. For convenience, each measurement position is referred to as a pixel. The response of the probe 12 to the pixel beneath it and the additional contribution to the measured potential due to those pixels adjacent to it allow an image to be constructed, as described below.

Figure 4A:
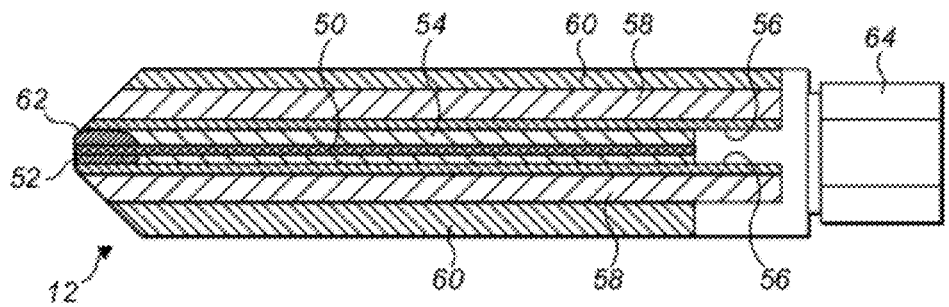
FIGS. 4a and 4b respectively comprise a longitudinal section and a cross section through the sensing probe.
Figure 4B:
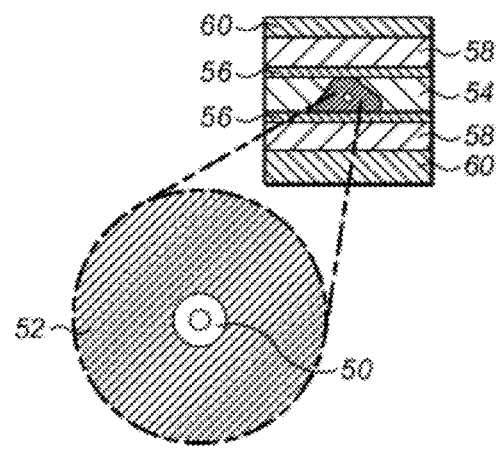

The sensing probe 12 is shown in FIG. 4 and comprises a glass insulated microwire 50, whose end is coated in silver paint 52. The glass insulated microwire 50 is set in epoxy resin 54 and sandwiched between a pair of copper plates 56. The silver paint 52 is situated right at the tip end of the glass insulated microwire 50, touching both the glass insulated microwire 50 and the copper plates 56 to forms a coaxial guard around the microwire electrode 50, preferably spaced by no more than 1 μm, in order to confine the electrode spatial sensitivity. It has been found by a finite element method (FEM) that the diameter of the guard electrode is of supreme importance in defining the spatial sensitivity of the probe. When a 5 μm electrode is spaced from a sample by 5 μm, we have found that the resolution of the imaging system is also close to 5 μm. When the electrode-sample spacing is increased resolution drops off approximately linearly with spacing. As such, the system allows flexibility in spatial resolution, allowing scanning to be performed at higher speed over larger areas with reduced resolution using the same electrode.

The pair of copper layers 56 are respectively mounted on a pair of printed circuit board (PCB) substrates 58, which are also coated in layers of epoxy resin 60. This composite structure is formed at one end into a pointed tip 62 exposing the microwire 50 towards the fingerprint sample on the sheet 20; and at the other end is terminated by a subminiature version A (SMA) connector 64, which permits the sensing probe 12 to be detachably connected to the electric potential sensor 10. This allows the sensing probe 12 to be exchanged for probes of differing sizes, according to the desired spatial sensitivity.

Several probes have been produced having various sense electrode diameters, from 5 μm up to several mm, enabling flexibility in imaging resolution, sensitivity, and measurement speed. As described, the probes are potted in epoxy resin, mechanically robust and have a long service life. The co-axial electrode structure is designed to minimize the influence of adjacent pixels on the probe.

The present invention utilizes an electric potential sensor (EPS) as has been described in our earlier published patent specification no. WO 03/048789, the contents of which are incorporated herein by reference.

Figure 5:
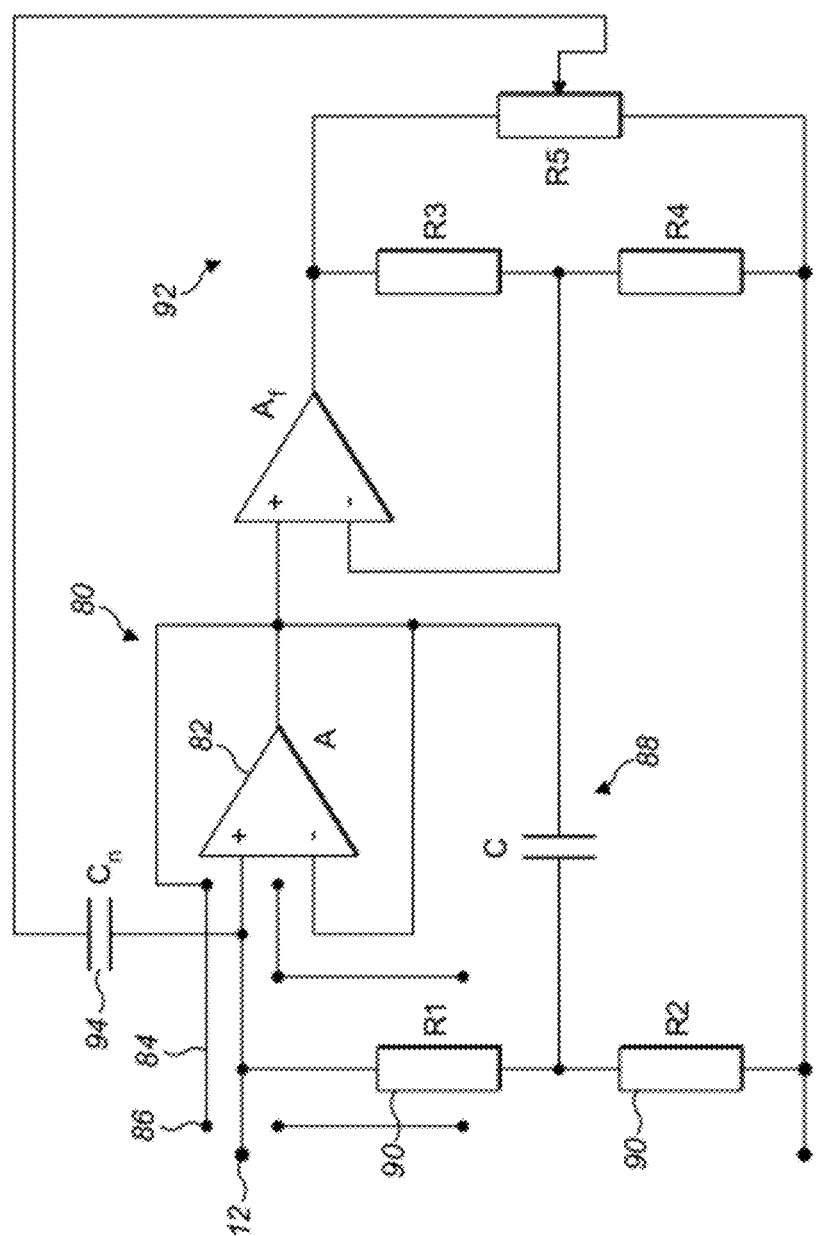
FIG. 5 is a block diagram of an electric potential sensor employed in the fingerprint detection apparatus of FIG. 1.

The particular embodiment of electric potential sensor 10 employed in the present instance is illustrated in FIG. 5, and features an electrometer 80, which may comprise an amplifier 82, or other equivalent circuitry, and which is connected to the sensing probe 12 for receiving measurement signals from the probe 12. The electric potential sensor 10 further comprises a combination of ancillary feedback circuits cumulatively arranged to increase the sensitivity of the electrometer to small electrical potentials whilst not perturbing the electrical field associated therewith. In the present instance, the ancillary circuits providing the feedback arrangement comprise guarding, bootstrapping and neutralisation circuits as shown in FIG. 5.

More especially, a guard circuit 84 provides a shield 86 for the electrode and the input wiring for the amplifier 82, the guard circuit 84 being driven by the output of the amplifier 82 and being arranged to maintain the same potential on the sensing probe as on the shield. With reference to FIG. 4, the silver paint 52 forms the shield 86 around the glass insulated microwire electrode 50 in the present embodiment. The silver paint 52 is advantageously spaced by no more than one micrometer from the microwire electrode 50, in order to confine the electrode spatial sensitivity. The silver paint 52 shield physically surrounds the microwire electrode 50 and is connected to the associated circuitry, and the guard circuit 84 maintains the same potential on this shield 86 as on the electrode 50, thus removing the effects of stray capacitance.

A bootstrapping circuit 88 combined with a DC input bias arrangement 90 provides a further feedback arrangement. The DC input bias arrangement 90 includes a biasing resistor arrangement of two series resistors R1, R2 for providing a steady input bias current for the amplifier 80, and the bootstrapping circuit 88 applies the output voltage of the electrometer to the mid point of the two resistors via a capacitor C to bootstrap the biasing resistor arrangement 90 of the DC input biasing arrangement 88 for increasing the effective input impedance.

A neutralisation circuit 92 introduces the output signal of the amplifier 80 directly to its input by way of a small capacitor 94 for reducing the intrinsic input capacitance of the amplifier 80. The circuit 92 also includes resistors R3 and R4 and potentiometer R5 to set the neutralisation to the desired level.

Such combination of feedback circuits results in a high input impedance electric potential sensor 10, which is extremely sensitive.

The electric potential sensor 10 couples capacitively to the source of electric potential. A capacitive divider is therefore formed between the electrode-source capacitance, $C_{es}$, and the input capacitance (capacitance to ground) of the electric potential sensor, $C_{in}$, as shown in FIG. 5. This divider ratio sets the sensitivity of the microscope. Since the guarding of the input electrode confines the effective area to the diameter of the centre sense electrode, we can use this diameter to approximate $C_{es}$ as a parallel plate capacitor. This approximation has been found to provide the most accurate agreement with experiment, versus more complicated geometries. This capacitance is then given by Equation 1:

$$C_{es} = \frac{\varepsilon_0 \varepsilon_r \pi r^2}{d} \quad (1)$$

where r is the effective electrode radius and d is the electrode-source separation. The ratio of source potential to electric potential sensor output potential is given by:

$$\frac{V_{out}}{V_{in}} = \frac{C_{es}}{C_{es} + C_{in}} \quad (2)$$

$$\frac{V_{out}}{V_{in}} = \frac{\alpha}{\alpha + d} \text{ where } \alpha = \frac{\varepsilon_0 \varepsilon_r \pi r^2}{C_{in}}$$

Using a 5 μm diameter electrode and an electrode-source separation of 5 μm, where resolution is maximized, this ratio is found to be 0.7 for an electric potential sensor input capacitance of 0.1 fF, assuming $\epsilon_r$=1 in air. The electric potential sensor input capacitance is found by measuring the electric potential sensor response through a calibrated test capacitor. With an electric potential sensor's input referred noise voltage of 10 μV/√Hz, surface potentials of a few tens of millivolts may be detected in a broadband measurement, with scope to significantly improve this sensitivity using narrow band or lock-in measurements. Performing this calculation illustrates the importance of extremely low input capacitance when performing high spatial resolution measurements.

Surface charge measurement is achieved in a method similar to the capacitive probe, in which surface charge is measured by the voltage induced on the electrode when it is brought in proximity with the charged surface. In contrast to conventional capacitive probes, the electric potential sensor has excellent DC stability with zero input bias current, and a much lower input capacitance than traditional capacitive probes, typically $10^{-16}$ F.

Figure 6:
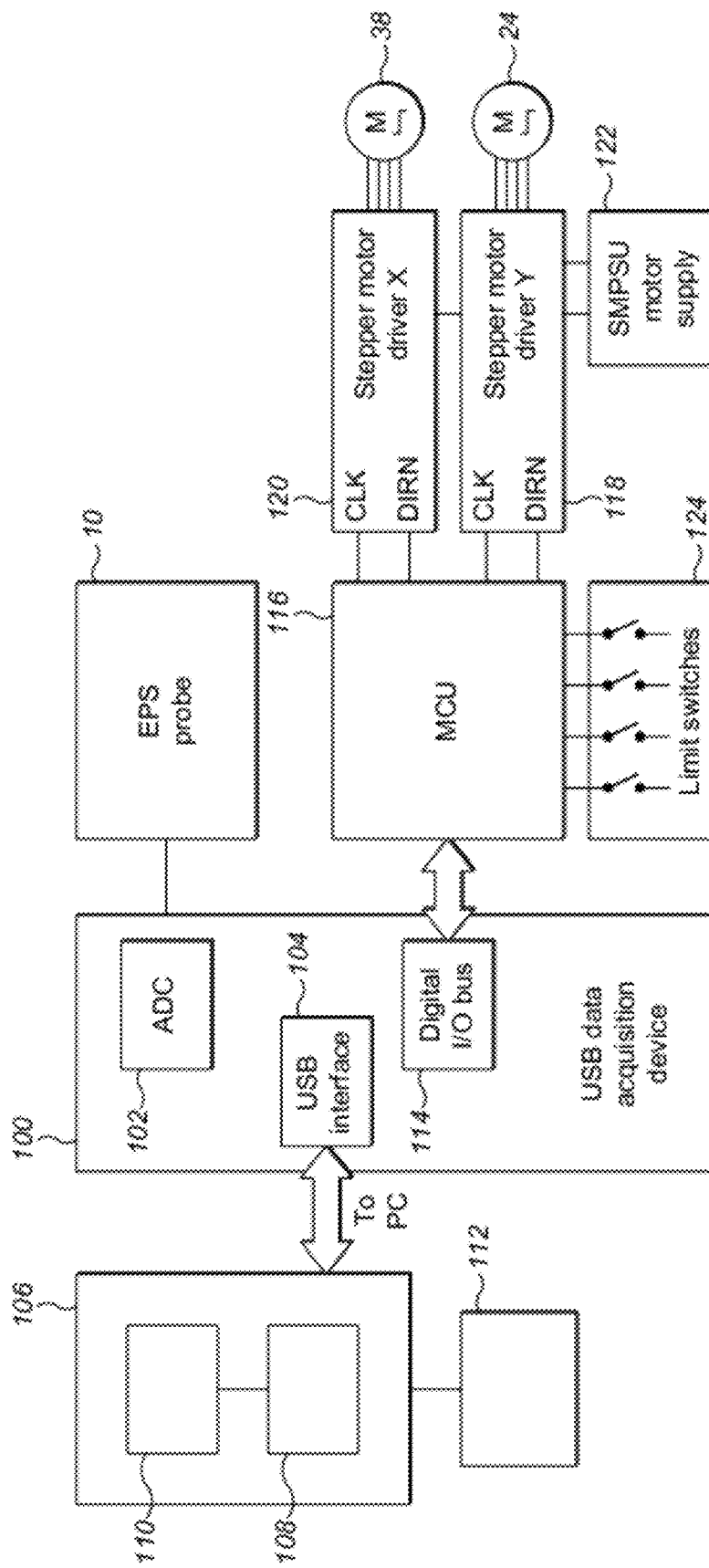
FIG. 6 is a schematic block diagram of the control and processing electronics for the scanning apparatus of FIG. 1.
Figure 7:
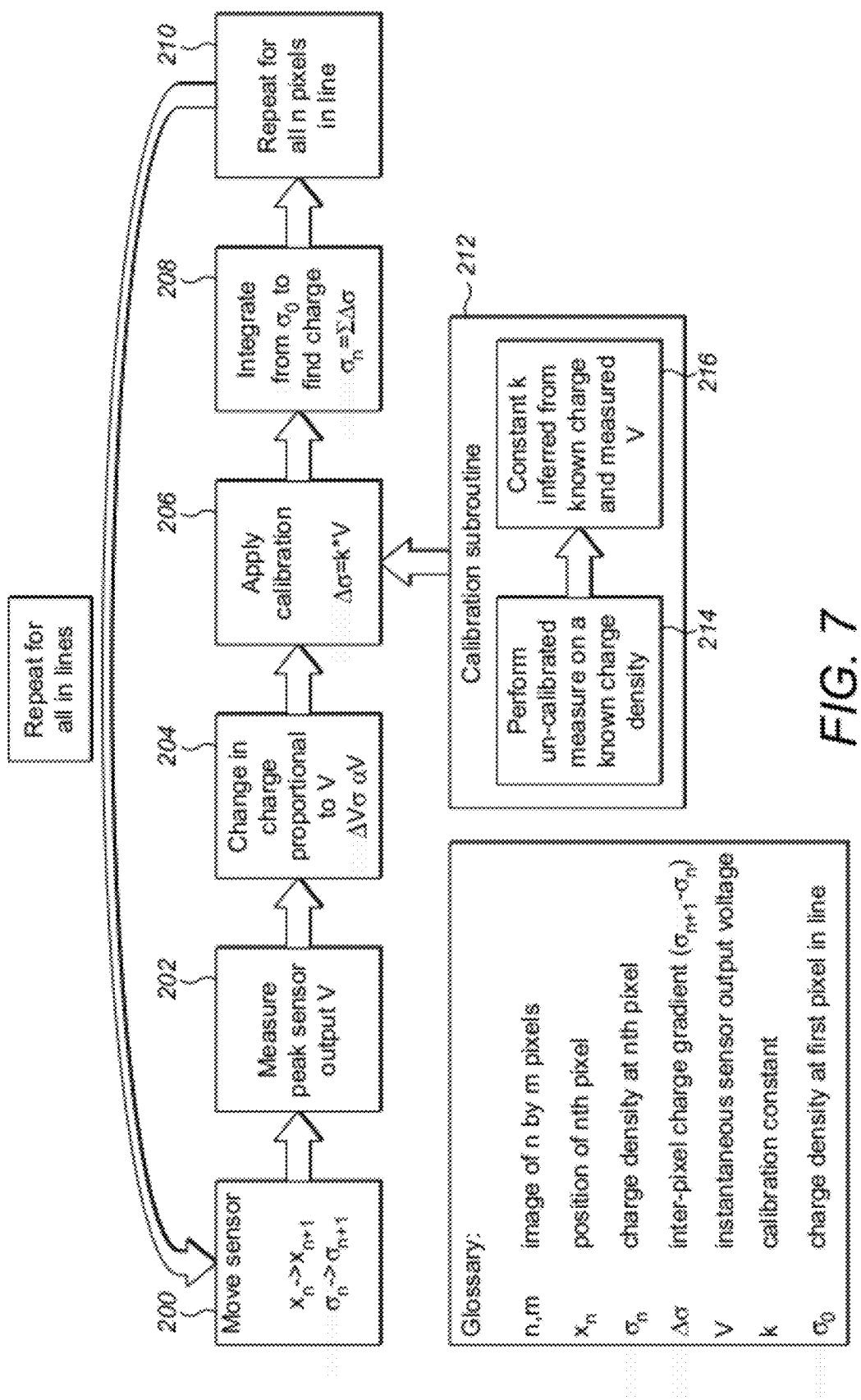
FIG. 7 is a flow chart representing the operation of fingerprint detection by the fingerprint detection apparatus.

Turning to FIGS. 6 and 7, the overall operation of the fingerprint detection apparatus according to the present invention will now be described. FIG. 6 shows a block diagram of the circuitry of the fingerprint detection apparatus, including the electric potential sensor 10 for detecting the surface charge on the sample sheet 20 and supplying measurement signals to a data acquisition device 100. The measurement signals issued by the electric potential sensor 10 comprise analogue signals, and the data acquisition device 100 includes an analogue to digital converter 102 for converting the analogue measurement signals into digital measurement signals for supply via a USB interface 104 to a PC 106 incorporating control software 108 and a processor 110 for generating output images for display on a display 112.

As well as collecting the digital measurement information supplied by the electric potential sensor 10, the control software 108 and processor 110 serve for synchronising and controlling the stepper motors 24, 38 of the positioning and scanning system for stepping movement of the electric potential sensor 10 from point to point (pixel to pixel) between detection intervals. For this purpose, the control software 108 also comprises a raster scan control application, which through the processor 110 controls the supply and collection of stepper motor control information via the USB interface 104 and a digital input-output interface 114 of the data acquisition device 100. The stepper motor control information is converted to drive signals for controlling the stepper motors 24, 34 by a microcontroller 116 and the drive signals are issued to stepper motor drivers 118, 120 powered by a motor supply 122 for driving stepper motors 38, 24 respectively. A series of limit switches 124, situated at the end of the travel tracks provided by the rails 32 and the cross bar 26, cut in when the gantry 22 and the carriage 36 approach the ends of their travel to prevent mechanical shocks and damage.

The fingerprint detection apparatus according to the invention as described above, and the associated scanning and measuring technique, may be employed for the purpose of collecting fingerprints on samples and for evaluating the results. Such technique and the associated results will now be discussed with reference to FIGS. 7 and 8.

FIG. 7 shows a flow chart of the steps involved in the building up a fingerprint image using the fingerprint detection technique according to the invention. As shown, the sensor probe 12 is first moved to position n, or pixel n, in the X-direction by means of the stepper motor 38. This takes place at step 200. When the probe 12 is at pixel n, a measurement is taken, and the voltage output of the electric potential sensor 10 is detected. It is to be appreciated that the movement of the probe into position is required to generate such voltage measurement. The peak voltage output V is recorded by the processor 110. This takes place in step 202. In step 204, the change in charge density (Δσ) is determined by the processor 110, Δσ being proportional to the voltage output V. The change in charge density (Δσ) is recorded, and then in step 206 the processor 110 applies calibration by multiplying by a constant k, which has been predetermined. The processor 110 proceeds to step 208 and performs an integration to determine the charge density at position n, which is stored. In step 210, the processor 110 issues an instruction to move the probe 12 from position n to position n+1, whereupon the probe is moved to position n+1, and the process is repeated from step 200 for the next pixel n+1.

When all the pixels have been measured in a particular row in the X direction, then the processor 110 issues an instruction to the stepper motor 24 to move the gantry 22 to the next row in the Y direction, and steps 200 to 210 are repeated for every pixel in the new row.

Calibration is performed at the outset of the procedure, by determining a calibration constant k that is a function of the probe-sample separation and parameters of the probe, the sensor and the signal processing system. More particularly, the calibration constant k is a function of the following parameters: probe-sample separation, probe diameter, sensor input impedance, sensor gain, signal processing characteristics (including frequency domain filtering, scaling), probe velocity during inter-pixel movement, and the relative timings of movement and measurement. The calibration subroutine is shown in step 212, and involves taking an uncalibrated measurement using the electrical potential sensor 10 from a clean location of the material 20, at which location a specified charge density of known quantity has been applied. This takes place in step 214. Based on the measurement obtained by the electric potential sensor 10 and the known charge density, then a calibration constant k is calculated from the voltage measurement just obtained and from the known charge density. This takes place in step 216. Re-calibration, by means of the same subroutine, is subsequently necessary in the event that any of the parameters listed above is changed.

The method according to the invention enables the measurement of surface charge density with high sensitivity and low noise. The very low input capacitance of the electric potential sensor overcomes the attenuation of signals when using very small electrode areas, so enabling high spatial resolution surface charge measurements of up to 5000 dots per inch (dpi).

Experimental results have been obtained for the measurement of surface charge density on a sheet of insulating material bearing a fingerprint using a coaxial probe with a 25 µm diameter sense electrode, capable of resolving features with 100 µm spatial resolution (250 dpi) and minimum detectable surface charge density of 5 $\mu C\ cm^{-2}$. The procedure is discussed below.

The mechanism which produces the invisible surface charge fingerprint on a plastic is known as triboelectric charging. This is the familiar but poorly understood process by which insulating materials acquire charge as a result of contact or rubbing. When an object, conductive or insulating, is brought into contact with such a material, and subsequently removed, a small amount of charge is deposited on the insulating material. The exact quantity of charge produced is largely material dependent and is related qualitatively to the triboelectric series, which ranks materials according to their tendency to charge upon contact. The surface charge distribution produced during tribocharging is confined to the points of contact, and therefore serves as an impression of the contacting object. For common plastics, this spatial charge distribution decays below measurable levels over a period of days or weeks. During this slow charge decay process, the spatial definition of the charge distribution remains intact with the absolute level of the charge being reduced, rather than spreading spatially.

The electric potential sensor probe 12 couples capacitively to the surface and is raster scanned at a constant height above the sample. Since the input capacitance of the electric potential sensor 10 is very small, output voltages of convenient amplitude can be produced from relatively low levels of surface charge. The input resistance of the electric potential sensor 10 forms a short input time constant of several milliseconds, so that any external DC (static) potentials rapidly decay on the sensor input. This enabled the measurement of surface charge gradient without any of the DC drift issues encountered with conventional (high input resistance, high capacitance) probes.

As described above, the measurement of static surface charge is performed by recording the transient output voltage of the probe 12 when it is moved from one position to the next. It is the movement of the probe 12 that enables measurement according to the invention, the amplitude of the measured voltage signal being proportional to the change in surface charge (the surface charge gradient) encountered during the step movement. The voltage output of the probe 12 can be related to the surface charge density by considering the various capacitances involved, or calibrated by an independent measurement of surface charge. The measure of surface charge density gradient is then numerically integrated to produce absolute surface charge density.

Samples of 50 µm thick clear PTFE sheet were used in the tests, with no sample preparations necessary before surface charge imaging, nor were the materials discharged by ionized air after removing from packaging. Natural fingerprints were applied to the plastics by a single donor, after washing the hands with soap and water and air drying. The donor finger was brought gently into firm contact with the PTFE sheet and removed again, the whole process taking approximately 1 second.

Figure 8:
FIG. 8 is an image of a pair of fingerprints obtained using the fingerprint detection apparatus of FIGS. 1 to 7.
Figure 9A:
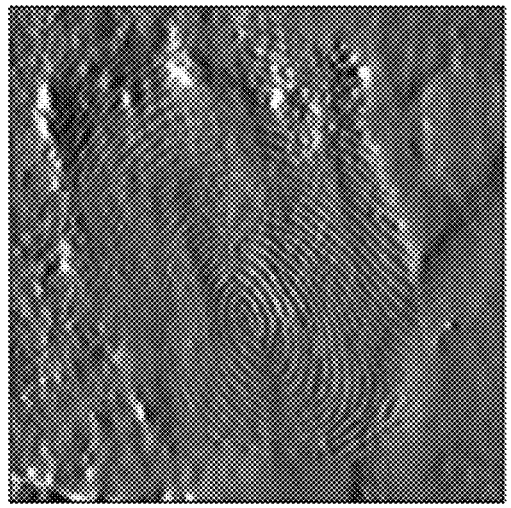
FIGS. 9a, 9b, 9c and 9d are fingerprint images obtained using the fingerprint detection apparatus of FIGS. 1 to 7, made respectively immediately after a fingerprint is deposited, five days after deposit, fourteen days after deposit, and after exposure to ionised air.
Figure 9B:
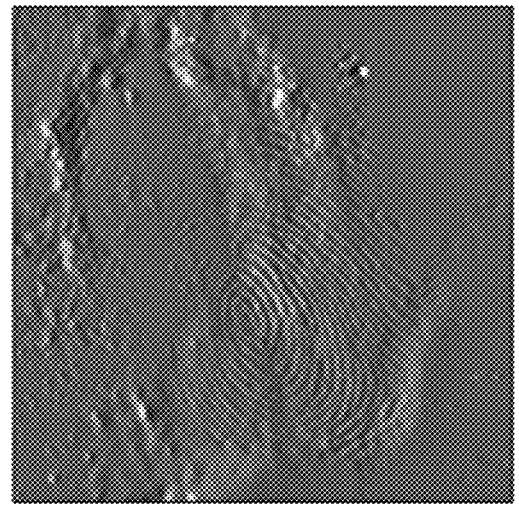
Figure 9C:
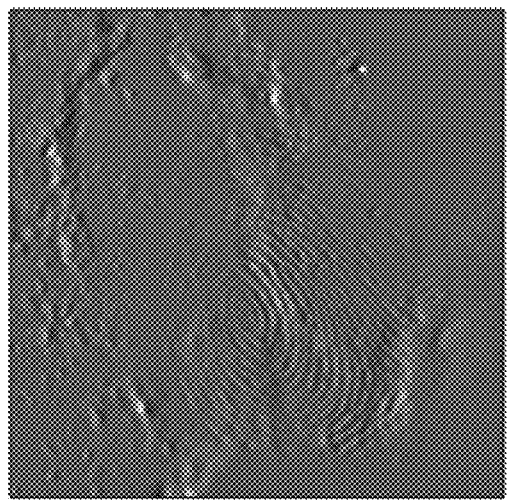
Figure 9D:
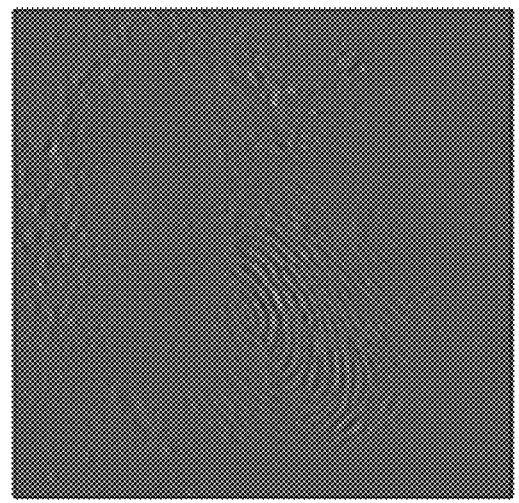

The image obtained using the raster scanning system and method described above, for the absolute surface charge density, is shown in FIG. 8. The scan area here is 36 mm×36 mm consisting of 300×300 pixels, corresponding to a 120 µm pitch, with a total scan time of 75 minutes. The probe to sample working distance should be comparable to the spatial resolution required, and was held fixed at 80 µm for this data. Because the PTFE sample material was not discharged using ionized air prior to the measurement, it is likely that a large magnitude but spatially uniform surface charge existed on the sample. Creases in the plastic are highly visible in the surface charge scans partially due to the charge produced on the surface during the crease formation, and from the tendency of the crease to produce a large charge gradient. The high spatial and charge resolution of the electric potential sensor scanning probe 12 reveals a latent electrostatic fingerprint. A single contact by a finger leaves a charge impression on the insulating plastic surface, which may be partially confined within the surface of the plastic itself, and also within the deposits left behind by the finger contact. No special preparations or development processes are required before imaging and the measurement is completely non-destructive meaning that it may be repeated, since the charge distribution is undisturbed.

The present invention, whilst primarily directed at surface charge measurement for detecting fingerprints, is capable of latent fingerprint imaging in the sense of being able to detect invisible prints. Furthermore, the surface charge measurement may also be employed for timeline estimation for the purposes of dating fingerprint residues, as described below.

FIG. 9 shows the decay of a charge image over a period of 14 days, immediately after a fingerprint is deposited, five days after deposit, fourteen days after deposit, and after exposure to ionised air. This last situation was tested, because ionised air is conventionally used to remove all charge on a surface and eliminate any surface topography, for example due to fingerprint contact. The definition of the latent image remains intact throughout, although the overall level of charge is seen to diminish with time. FIG. 9*d* even shows a charge image when the sample has been discharged using ionized air, and a weak fingerprint image remains visible. This can be attributed to several effects, the inability of ionized air to completely remove any surface charge and differential discharging between the bare PTFE material and the areas where fingerprint residue is present.

The decay of charge over time gives latent fingerprint charge images the useful property of strong time dependence. This property has two clear benefits; very old fingerprints are not visible using charge imaging and it may be possible to date or time-sequence recent prints. The amount of charge deposited by a finger contact on a given insulating material is largely dependent on the material and nature of the contact, and largely independent of the subject conditions including the charge being carried on the finger. It may therefore be possible to make an estimate of the initial charge.

Figure 10A:
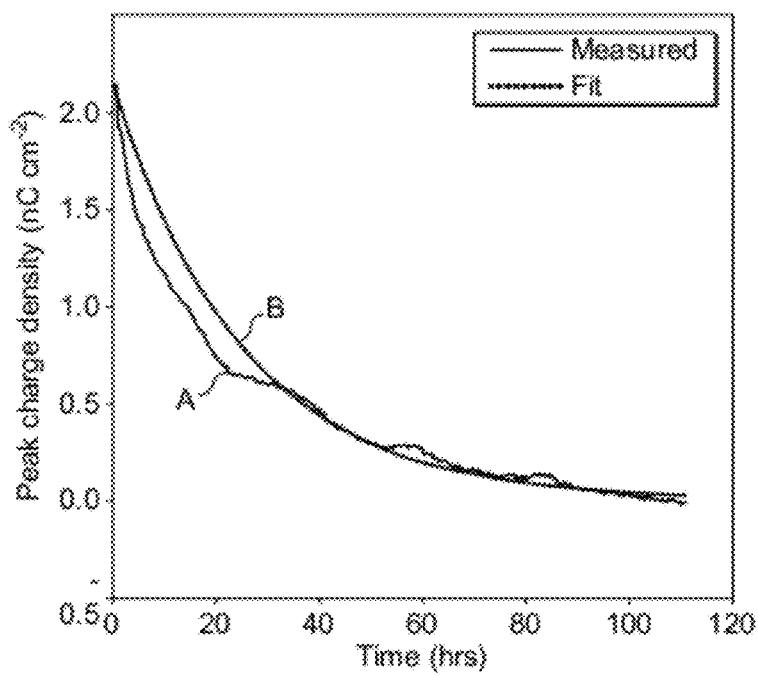
FIGS. 10a and 10b are graphs respectively showing the peak service charge density of a single latent charge fingerprint ridge based on measurements repeated at thirty minute intervals for 110 hours, and showing the profile of the latent fingerprint ridge in terms of charge density at selected specified times.
Figure 10B:
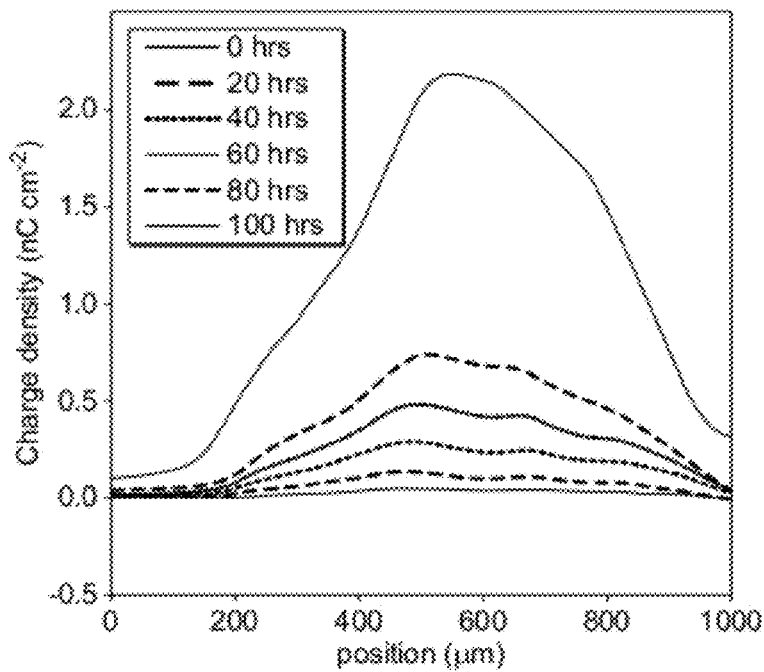

The charge decay versus time for a single pixel of a fingerprint image on a PTFE substrate is shown in FIG. 10. Such a decay curve is easily obtained for any given material using the present charge imaging method. A clear exponential decay is observed, with additional variations synchronized with the diurnal cycle. At certain points the graph indicates an apparent increase in surface charge. This is caused by environmental conditions affecting the relation between actual surface charge and sensor output voltage, and is therefore erroneous.

The data of FIG. 10 is compared with a standard exponential decay curve, shown as a dotted line, fitted for a charge Q at time t as, $Q(t)=Q_0 \exp[-t/\tau]$ where $\tau$ is chosen for the best fit to the graph, and $Q_0$ taken to be the charge at time t=0, corresponding to the time of the first measurement. The charge decay rate, $\tau$, is dependent on both material and environmental factors. The intrinsic decay rate, due to the material, may be easily determined experimentally using the present technique and a known test charge. It has been previously shown that repeated measurements made using this method have no effect on the charge decay rate, demonstrating the non-destructive nature of the measurement. Not only is the surface charge distribution undisturbed, but any surface deposits from the fingerprint also remains intact. Whilst attempts have been made to quantify the triboelectric charge for a given material, variations in composition and surface treatment make producing a universal data set difficult. Instead, it is more useful to have the ability to make triboelectric charging and decay-time measurements in the lab for a given sample, easily achieved for any material using the electric potential sensor scanning system.

Figure 11:
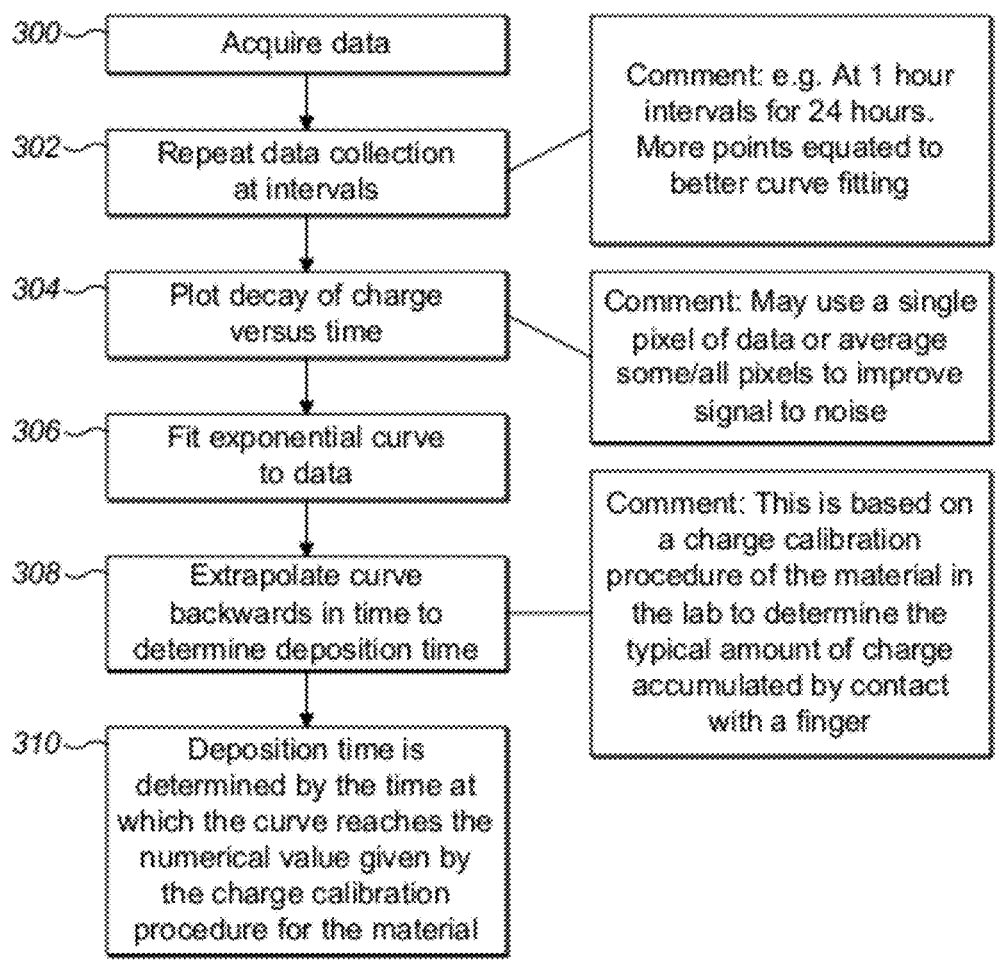
FIG. 11 is a flow chart representing the operation of fingerprint dating by the fingerprint detection apparatus.

FIG. 11 shows a flow chart for employing the above characteristics to provide a fingerprint dating method according to the present invention. As shown, the electric potential sensor 10 is controlled to follow the steps described with reference to FIG. 7 to generate data and a fingerprint record in step 300. The data collection is repeated in step 302 at regular intervals, for example at intervals of one hour over a period of 24 hours. With the aid of such data, a plot of the decay of charge density versus time is calculated in step 304. Such a plot may employ the data from a single pixel throughout at least a portion of the collection period, or it may employ an average of the associated data from a selected group or all of the pixels at each collection interval over at least a portion of the collection period. This latter possibility improves the signal to noise ratio. The plot thus obtained corresponds to the curve A shown in FIG. 10a. Next, in step 306, an exponential curve is fitted to the curve already plotted. Such exponential curve corresponds to curve B in FIG. 10a.

Having thus obtained an exponential curve that fits the measurements, it is possible in step 308 to extrapolate backwards in time to determine the moment when the fingerprint was deposited on the material. The processor 110 and control software 108 in the PC 106 are set up with an algorithm for this purpose, and a calibration procedure will already have taken place in the lab to determine the typical amount of charge accumulated by finger contact in the case of the particular material in question. Finally, in step 310 the fingerprint deposition time is determined and displayed.

Preliminary results have been presented for an electrical charge scanning system based on the electric potential sensor. Both the spatial distribution of the surface charge and the time dependent decay of that charge have been imaged. It has been demonstrated that the images obtained resolve common fingerprint features, as used for identification purposes, and that the quantity of charge in the latent fingerprint is strongly time dependent.

The present invention overcomes some significant problems with the prior art systems, in that scan time may be significantly reduced with real-time imaging possible over an area limited only by the size of the sensor positioning and scanning system. In such a device, the precise positional stability and control in the current system is due to the necessity to build up the image by raster scanning. The unique ability of the present invention to obtain charge information over large scan areas, with the potential to do so in real-time, opens up the possibility of a new forensic method for aging or time sequencing fingerprints.

This method is completely passive and requires no active signal source. Due to the high impedance of the electric potential sensor, no charge is removed during the measurement allowing charge decay processes to be observed. By applying this technique with the microscopic probe we can now image DC potentials at high spatial resolution and with increased sensitivity.

This technique differs from traditional electrostatic probes in two significant ways. First, it measures spatial potential gradient from one pixel measurement to the next, negating errors caused by DC drift in the sensor. This is achieved by allowing the voltage induced on the probe during a point measurement to decay over the short input time constant of the sensor formed between the very low input capacitance and a well defined input resistance of $10^{11} \Omega$ or less. Upon moving the sensor to the next measurement pixel, any change in spatial potential between the two points results in an impulse on the sensor proportional to the potential gradient between the two measurement points. The second benefit over conventional methods is the vast range of potentials which can be measured. Straightforward adjustment of the sensitivity of the probe allows electrostatic potentials from several kilovolts down to source potentials of a few volts to be measured. This is achieved by adjusting the input capacitance of the probe in order to utilize the capacitive divider inherent in the measurement to reduce higher voltages to a safe level. The maximum measurable potential is limited only by electrical breakdown over the source-electrode capacitance, which is expected to occur at levels greater than 10 kV when operating at maximum spatial resolution. In the event that breakdown should occur, ESD protection on the electric potential sensor input will protect the sensor from damage.

Various modifications to the described apparatus are possible within the scope of the present invention.

For example, a second distinct measurement mode allows the imaging of DC potentials on surfaces by means of an array of electric potential sensors, in place of a single scanned sensor.

In this instance, the apparatus may include either a linear array arranged for one degree of scanning in the Y-direction, or a matrix array which is arranged to move one step to and fro or to oscillate in the Y-direction, in order to achieve the necessary movement for taking the required measurements.

Furthermore, charge density measurements employing the described apparatus are possible both for insulating and for semi-conductor materials.

The invention claimed is:

1. Apparatus for measuring charge density distribution at the surface of a material sample, comprising:
   an electric potential sensor, wherein the electrical potential sensor comprises a probe for capacitively coupling the electric potential sensor to the surface of a material sample, an amplifier for generating a measurement output, the probe being connected to an input of the amplifier and the measurement output being supplied at an output of the amplifier, and a feedback arrangement driven from the output of the amplifier for enhancing the input impedance of the amplifier;
   a positioning system configured to mount the probe of the electric potential sensor above the surface of the material sample and to move the probe at a constant height over the surface; and
   a processor configured to:
      repeatedly cause the positioning system to step the probe from a first to a second position;
      record a transient signal from the measurement output as the probe moves from the first to the second position for each step;
      determine a value proportional to a difference in charge density at the first and second positions from the transient signal for each step; and
      integrate the determined values with respect to position to obtain a profile of charge density against position.

2. Apparatus according to claim 1, wherein the feedback arrangement includes at least one of a guard surrounding an electrode of the probe, a bootstrapping circuit, and a neutralisation circuit.

3. Apparatus according to claim 1, wherein the probe comprises an insulated microwire, which has a tip coated with silver paint and which is encased in epoxy resin, the epoxy resin encased microwire being sandwiched between conductive plates of two printed circuit boards.

4. Apparatus according to claim 1, wherein the positioning system comprises a movable support, and at least one motor for moving the support to and fro.

5. Apparatus according to claim 4, wherein the support comprises a gantry movable in a Y-direction, and a carriage mounted on the gantry and movable in an X-direction, and wherein the at least one motor comprises two stepping motors respectively for moving the gantry and the carriage in the Y and X directions.

6. Apparatus according to claim 1, including a single electric potential sensor having a single probe, and wherein the positioning system comprises a scanning system for scanning the probe over the sample.

7. Apparatus according to claim 1, including a linear array of electrical potential sensors, each having a respective probe, and wherein the positioning system comprises a scanning system for moving the linear array in a direction perpendicular to the array across the sample.

8. Apparatus according to claim 1, including a matrix array of electric potential sensors, each including a respective probe, and wherein the positioning system is arranged to produce an oscillating movement of the matrix array over the sample.

9. Apparatus according to claim 1, including control software for causing the processor to convert the digital record into an image, and a display for showing the image.

10. Apparatus according to claim 1 for detecting a charge density distribution resulting from a fingerprint, comprising a store for the digital record of the fingerprint, and a display for displaying an image of the fingerprint.

11. Apparatus according to claim 10, including control software for causing the processing system at predetermined intervals to collect data based on said measurement output, to calculate a plot of charge density decay versus time, and to extrapolate the timing when the fingerprint was deposited based on the said plot, for dating said fingerprint.

12. A method of detection charge density distribution at the surface of a material sample, comprising:
- mounting a probe of an electric potential sensor above a material sample, wherein the electrical potential sensor comprises said probe for capacitively coupling the electric potential sensor to the surface of the material sample, an amplifier for generating a measurement output, the probe being connected to an input of the amplifier and the measurement output being supplied at an output of the amplifier, and a feedback arrangement driven from the output of the amplifier for enhancing the input impedance of the amplifier;
- moving the probe at a constant height over a surface of the said material sample by repeatedly stepping the probe from a first to a second position;
- recording a transient signal from the measurement output as the probe moves from the first to the second position for each step;
- determining a value proportional to a difference in charge density at the first and second positions from the transient signal for each step; and
- integrating the determined values with respect to position to obtain a profile of charge density against position.

13. A method according to claim 12, applied to the detection of a fingerprint on a surface of an insulating or semiconductor material sample.

14. A method according to claim 13, further comprising:
- at predetermined intervals collecting data based on said measurement output;
- calculating a plot of charge density decay versus time; and
- extrapolating the timing when the fingerprint was deposited based on the said plot, for dating a said fingerprint.

* * * * *